United States Patent [19]
Broz

[11] 3,789,768
[45] Feb. 5, 1974

[54] SLOT CAR TRACK CLEANING DEVICE

[75] Inventor: Jerry J. Broz, Scranton, Pa.

[73] Assignee: Twinn-K, Inc., Indianapolis, Ind.

[22] Filed: Nov. 6, 1972

[21] Appl. No.: 303,699

Related U.S. Application Data

[63] Continuation of Ser. No. 103,731, Jan. 4, 1971, abandoned.

[52] U.S. Cl.......................... 104/279, 15/54, 46/216
[51] Int. Cl............................................. B24b 23/00
[58] Field of Search.......... 15/54, 55; 104/279, 280; 46/1 K, 216; 238/10 E, 10 F

[56] References Cited
UNITED STATES PATENTS

| | | | |
|---|---|---|---|
| 485,348 | 11/1892 | Leigh | 15/55 |
| 524,434 | 8/1894 | Ehlert | 104/279 |
| 573,842 | 12/1896 | Turner | 15/54 |
| 1,431,474 | 10/1922 | McWhirter | 104/279 |
| 2,042,029 | 5/1936 | Smith | 104/279 |
| 3,103,897 | 9/1963 | Bonanno | 104/279 |
| 3,339,923 | 9/1967 | Nadolny | 273/86 |
| 3,631,636 | 1/1972 | Nadolny | 15/54 |

Primary Examiner—Gerald M. Forlenza
Assistant Examiner—Richard A. Bertsch
Attorney, Agent, or Firm—Woodard, Weikart, Emhardt & Naughton

[57] ABSTRACT

A slot car track cleaning device for removing foreign matter from the conductors and bed of the slot car track. A main body having wheels rotatably mounted thereon is propelled on the slot car track by an electric motor housed within the main body. Wipers contacting the track conductors are electrically connected to the motor. The motor rotatably drives the rear wheels of the slot car. An abrasive conductor cleaner projects from the slot car and contacts the track conductors. A petroleum distillate saturated wick extends from the rear of the slot car removing lint and other foreign material from the track. The wick extends out of a tank formed within the main body having cleaning liquid therein.

8 Claims, 4 Drawing Figures

INVENTOR.
JERRY J. BROZ
BY
Woodard, Weikart, Emhardt & Naughton
ATTORNEYS

SLOT CAR TRACK CLEANING DEVICE

This is a continuation of application Ser. No. 103,731, filed Jan. 4, 1971, now abandoned.

BACKGROUND OF THE INVENTION

1. Field of the Invention

This invention is in the field of cleaning devices for slot car tracks.

2. Description of the Prior Art

Slot cars have electric motors which propel the slot cars on the track. The track has a pair of parallel upraised conductors extending the length of the track connected to a source of electrical energy. Wipers extending from the bottom of the slot car contact the pair of conductors and route the electrical energy to the motor of the slot car. As the slot car passes repeatedly over the track, the wipers will highly polish the track conductors. Oxides will develop on the surface of the track conductors when not in use. As a result, resistance is developed between the track conductors and the slot car wipers. Thus, the flow of current to the motor via the conductors and the wipers is impeded and the speed of the slot car is thereby reduced. A solution to this problem is to remove the oxides as well as lint and similar matter from the track by rubbing an abrasive material across the conductors and then by cleaning the entire track of dust and lint, (which cause loss of traction) with a soft cloth. This manual operation consumes a large amount of time depending upon the length of track to be cleaned and must be repeated almost daily for efficient operation of the slot car.

The present invention provides a slot car which may be propelled around the track and which has an abrasive conductor cleaner extending beneath the front portion of the car. Extending from the rear portion of the car is a felt cloth saturated with cleaning liquid which picks up the foreign material lying on the track. The guide pin of the car, received by the channel of the track, is positioned behind the center line of the front axle of the car instead of at the traditional location at the center line of the front axle or in front of the center line of the front axle. The positioning of the guide pin prevents the abrasive block from contacting the track conductors at the same location all of the time.

SUMMARY OF THE INVENTION

A device for cleaning the conductors and bed of a slot car track. A slot car operable on the track has an abrasive conductor cleaner mounted to the car in sliding contact with the track conductors. A second cleaner extending from the slot car is in sliding contact with the bed.

It is an object of the present invention to provide a device for removing oxides from slot car track electrical conductors and for removing lint and other foreign matter from the track bed.

It is a further object of the present invention to provide a slot car track cleaning device which is quickly and easily operable without requiring manual cleaning procedures.

In conjunction with the above objects, it is an object of the present invention to provide such a slot car track cleaning device which has supply means for holding cleaning liquid and which has a conductor cleaner which will not quickly wear out.

Related objects and advantages of the present invention will be apparent from the following description.

DESCRIPTION OF THE PREFERRED EMBODIMENT

Figure 1:
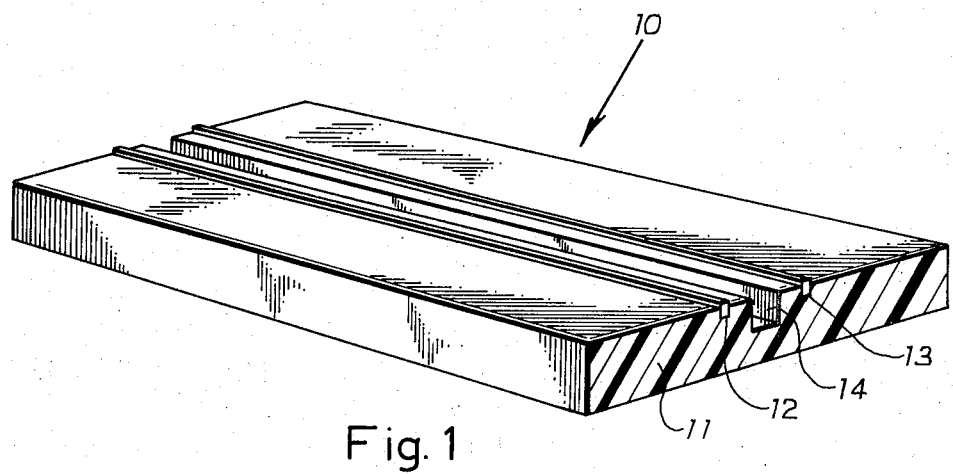
FIG. 1 is a fragmentary perspective view of a typical slot track which may be cleaned by the device disclosed by this specification.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown track 10 having a bed 11, normally made from plastic, with a slot 14 positioned in the center and extending along the length of bed 11. A pair of upraised conductor rails 12 and 13 are positioned equidistant from slot 14 extending approximately 0.040 inch above the top surface of bed 11. Conductors 12 and 13 are typically made from copper and allow electrical energy to flow from a source connected to the conductors to a motor positioned within a vehicle which operates on track 10.

Figure 2:
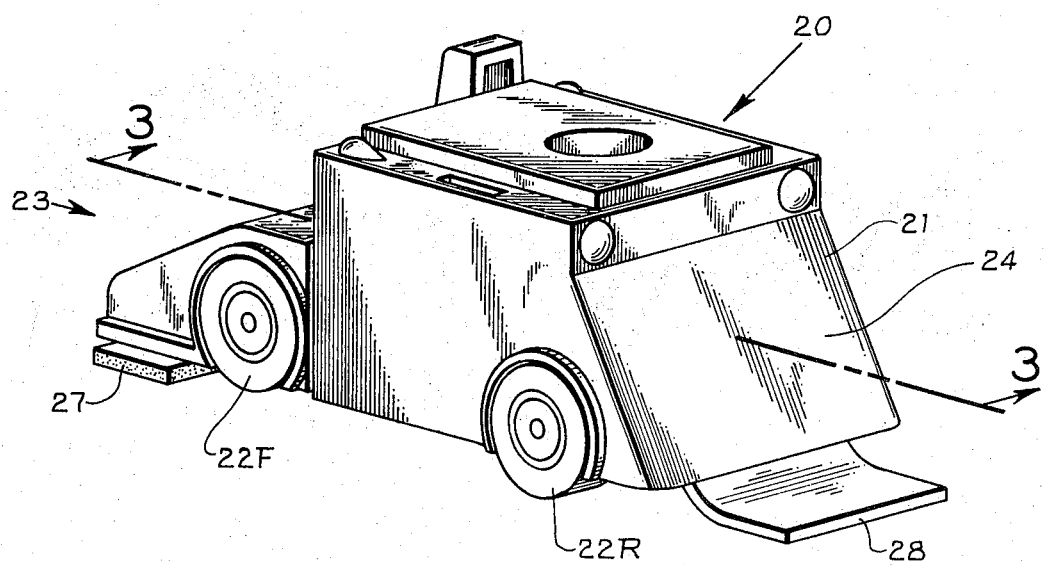
FIG. 2 is a perspective view of a slot car incorporating the present invention.
Figure 3:
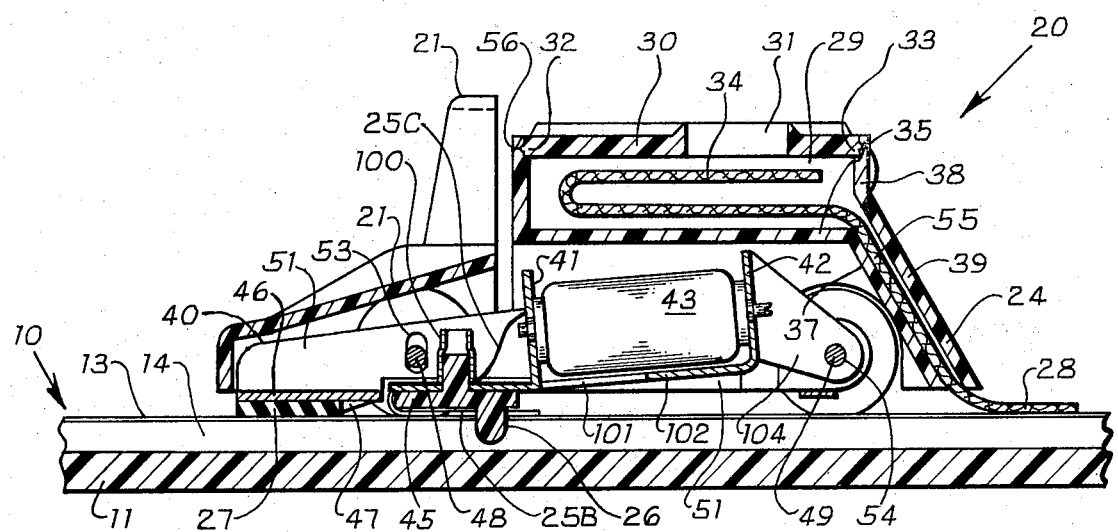
FIG. 3 is a section taken through the center of the car of FIG. 2 along the line 3—3 and viewed in the direction of the arrows.

FIG. 2 is a perspective view of a slot car 20 which may be operated on track 10 to clean bed 11 and conductor rails 12 and 13. FIG. 3 is a cross sectional view taken along the line 3—3 and viewed in he direction of the arrows, whereas FIG. 4 is a bottom view of the slot car.

Figure 4:
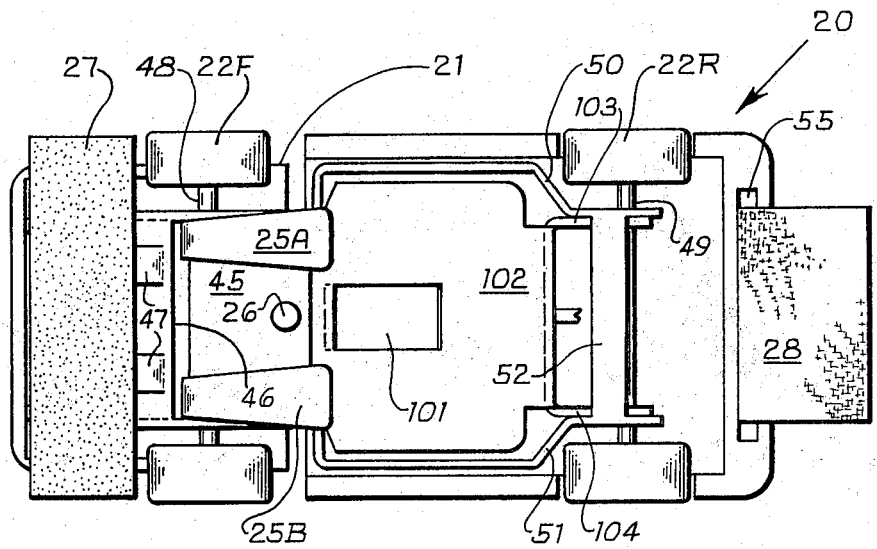
FIG. 4 is a bottom view of the car of FIG. 2.

Referring now to FIGS. 2 through 4, slot car 20 has a plastic main body 21 secured to a first chassis having a front crossmember 46, sidemembers 50 and 51, and a rear crossmember 52 (FIG. 4). The chassis sidemembers 50 and 51 are apertures at the rear to receive rear axle 49 to which rear wheels 22 R are fixed. An abrasive rail cleaner block 27 is secured to the front crossmember 46 of the first chassis and projects outward and downward from the front portion 23 of the body 21, and rests on conductor rails 12 and 13 of the track 10, for cleaning them. The first chassis sidemembers 50 and 51 are slotted as at 53 to receive front axle 48 to which front wheels 22 F are fixed. Because the axle can float vertically in the slot, the front of the first chassis and thereby the front of the car body are supported entirely by the cleaner block 27. The conductor cleaner 27 and slot car 20 have widths approximately equal as shown in FIG. 4. Projecting outward from the rear portion 24 of body 21 is a saturated wick 28 for cleaning the bed and conductors.

Car 20 has a motor 43 mounted on brackets 41 and 42 upstanding from crossmember 102 of a second chassis having rearwardly projecting arms 103 and 104 apertured to receive rear axle 49. A guide shoe 45 is affixed to the frontal portion of member 102 of the second chassis, having a tab projecting up through an aperture therein and retained in place by a short length of plastic tubing 100 serving as a retaining collar. The motor receives electrical energy from conductors 12 and 13 through the wipers 25A and 25B secured to the guide shoe, insulated from the chassis, and projecting below the lower side of the guide shoe and resiliently supporting the front end of the second chassis. Guide pin 26, affixed to guide shoe 45, is positioned between wipers 25A and 25B and rearward of the center line of the front axle 48. Pin 26 projects down into slot 14 of track 10. An opening 101 is provided in the chassis crossmember 102 in order to admit air to the motor for cooling.

Rear axle 49 is rotatably driven by motor 43. Suitable gearing (not shown) is used to connect the output of motor 43 to axle 49. A variety of motors may be used to drive the slot car. The speed of the car is controlled by controlling the voltage applied to the conductors 12 and 13, and thereby to motor 43.

As shown in FIG. 3, tank 29 in the body 21 holds a wick 28. The bottom wall 35 and back wall 38 of the tank 29 are integrally joined to wall 37 and 39 forming channel 55. Wick 28 extends down through channel 55 and out the rear portion 24 of the car. The opposite end of wick 28 is coiled 34 within tank 29 which also contains a suitable cleaning liquid. Excellent results have been obtained by using a high flash point petroleum distillate for the cleaning liquid and a felt material for the wick. An adequate amount of the cleaning liquid may be poured into the tank via hole 31 in order to completely saturate wick 28; however, care should be taken so as to not fill the tank with the cleaning liquid sufficiently so as to allow the liquid to seep out channel 55. Tank 29 is provided with a removable lid 30 in order to insert a new wick. As the end portion of the wick becomes dirty from cleaning the track, the end portion may be cut off and an additional length pulled from the tank. The front wall and back wall as well as the side walls of the tank are provided with a shoulder for receiving the bottom edge 33 of lid 30. The interior surface of the tank walls has a shoulder as shown at location 32, so as to allow lid 30 to be snapped into place and to be securely held by the walls of the tank and detents 56.

Front crossmember 46 of the first chassis has a pair of tabs 47 projecting downward abutting the back edge of abrasive conductor cleaner 27. The cleaner 27 may be glued to member 46 and an example of the material is rubber having aluminum oxide embedded therein. As the car is propelled along the track, cleaner 27 rubs along the top contact surface of conductors 12 and 13, thereby removing oxides and corrosion from the conductor. In order to prevent conductors 12 and 13 from contacting abrasive conductor cleaner 27 in only one location, guide pin 26 is located behind the block a substantial distance, so much so that, contrary to typical practice in slot cars, the guide pin is behind the center line of the front axle 48 of the car. Thus, the front portion 23 of the car is relatively unstable laterally as it is propelled down the track, preventing the conductors from contacting cleaner 27 in the exact same location as the car moves around the track, and thereby avoiding the wearing of grooves in the cleaner 27. However, the pin must not be so far back that the cleaner block will swing off the conductors as the car negotiates curves in the track. Wick 28 is sufficiently flexible so as to extend down past the conductors 12 and 13 to bed 11. The petroleum distillate saturated wick will pick up lint and similar matter on bed 11 as well as any particles which have fallen onto the bed as a result of the abrasive cleaning action of conductor cleaner 27.

It will be evident from the above description that the present invention provides a device for removing oxides from slot car track electrical conductors and for removing lint and other foreign matter from the track. The device is operable to quickly and easily clean the track without requiring the normal manual cleaning steps and has storage means for holding cleaning fluid. It may also be appreciated that the vehicle could be operated without any front wheels at all.

While the invention has been disclosed and described in some detail in the drawings and foregoing description, they are to be considered as illustrative and not restrictive in charater, as other modifications may readily suggest themselves to persons skilled in this art and within the broad scope of the invention.

The invention claimed is:

1. A device for cleaning a slot car track having conductors and a bed comprising:
   a slot car operable on said track;
   an abrasive conductor cleaner mounted to the front of said car in sliding contact with said conductors and supporting the front of said car;
   a second cleaner extending downward from said car behind said abrasive cleaner and in sliding contact with said bed;
   drive wheels at the rear of said car and supporting the rear of said car;
   a guide pin projecting downward from said car for guiding reception in a slot of a slot car track, said guide pin being behind said abrasive conductor cleaner.

2. The device of claim 1 and further comprising:
   a tank mounted to said car and containing cleaning liquid and having said second cleaner extending out therefrom.

3. The device of claim 1 wherein:
   said car has at least one front wheel and axle assembly behind said abrasive cleaner, and said guide pin extends beneath said car at a location rearward of the center line of said axle, said car having a front and rear portion, with said conductor cleaner positioned beneath said front portion and said second cleaner positioned beneath said rear portion, behind said drive wheels.

4. The device of claim 3 and further comprising:
   a slot car track bed with a pair of parallel conductors therein and a slot therebetween;
   said abrasive conductor cleaner extending completely across said conductors.

5. The device of claim 3 wherein:
   said conductor cleaner is rubber with aluminum oxide embedded therein; and,
   said second cleaner is felt.

6. The device of claim 5 wherein:
   said slot car has a tank thereon containing cleaning liquid;
   said slot car and said conductor cleaner have widths approximately equal;
   said second cleaner has a length with a portion thereof coiled within said tank; and said tank has a channel extending down toward the bottom of the car, with said second cleaner extending therethrough.

7. A slot car track conductor cleaner device comprising:
a self propelled car operable on a slot car track;
an abrasive cleaner affixed to said car in position for abrasively contacting the conductors of said track and supporting a portion of the car.

8. The conductor cleaner of claim 7 wherein:
said cleaner is mounted beneath the front of said car; and,
said car has a front axle and a guide pin positioned behind the center line of the front axle of said car and projecting into the slot of said track.

* * * * *